June 12, 1928.  1,673,210
C. Z. SMITH
AUTOMOBILE BRAKE
Original Filed Sept. 27, 1924    3 Sheets-Sheet 2
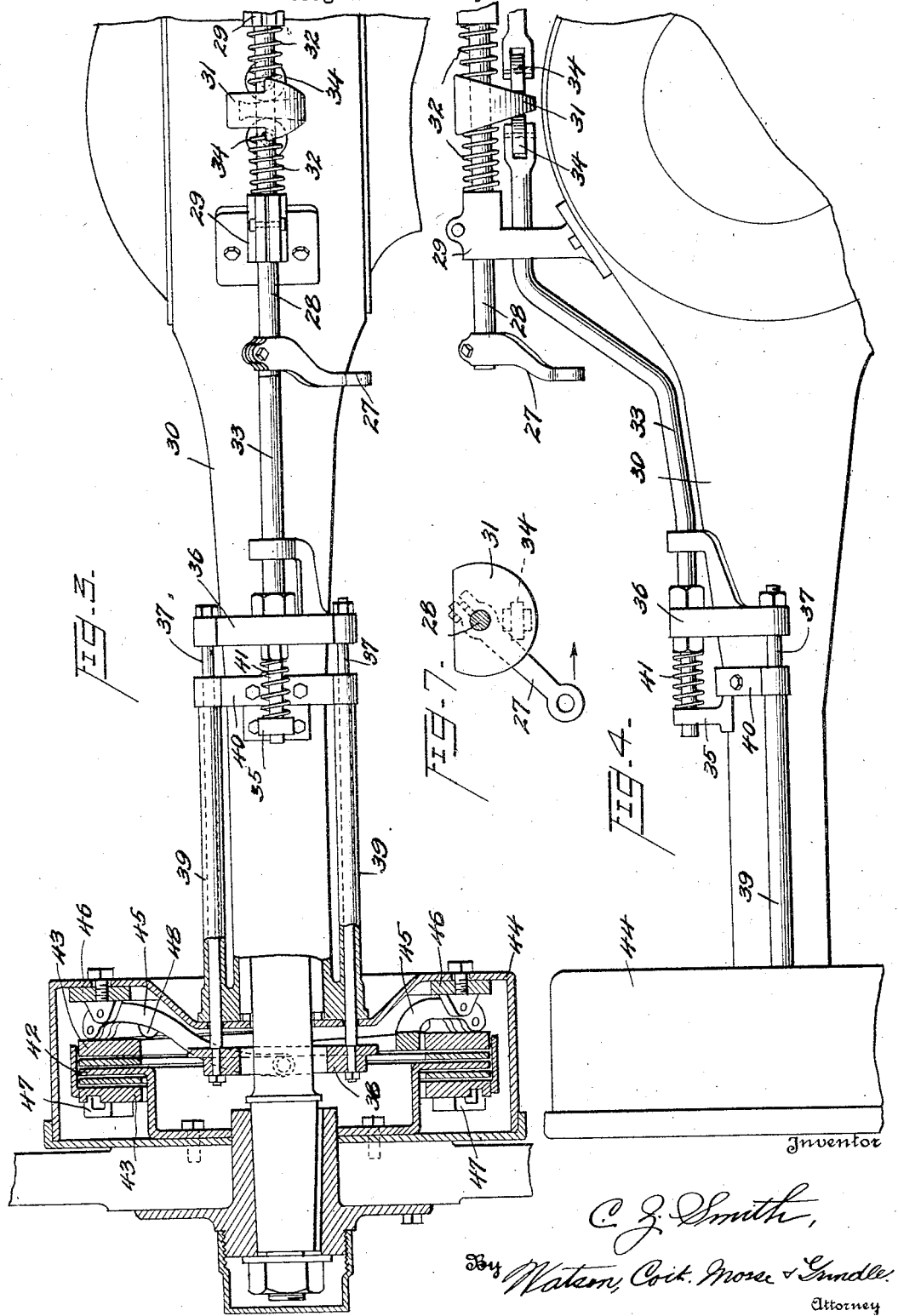
Inventor
C. Z. Smith,
By Watson, Cook, Morse & Grindle.
Attorney

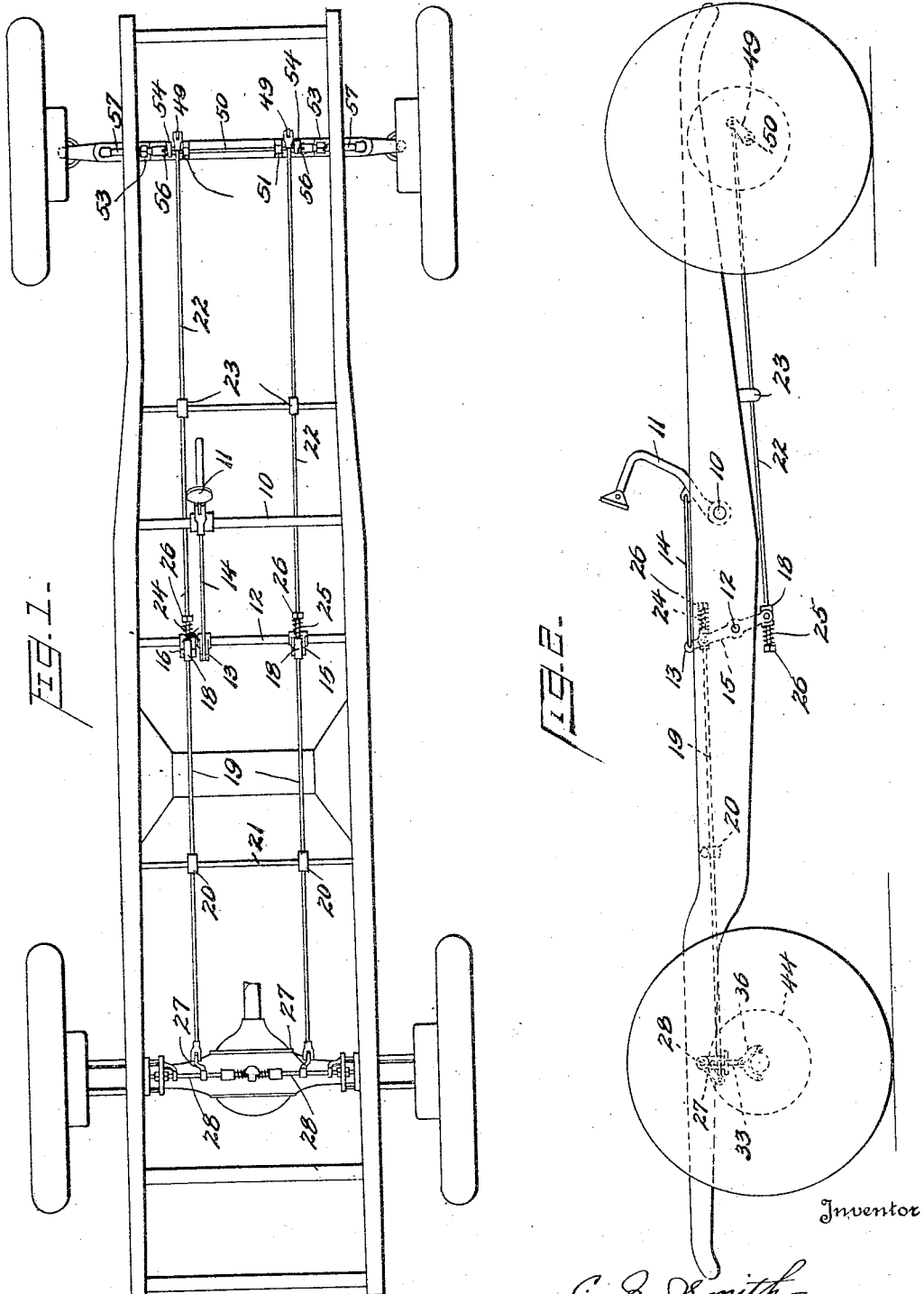

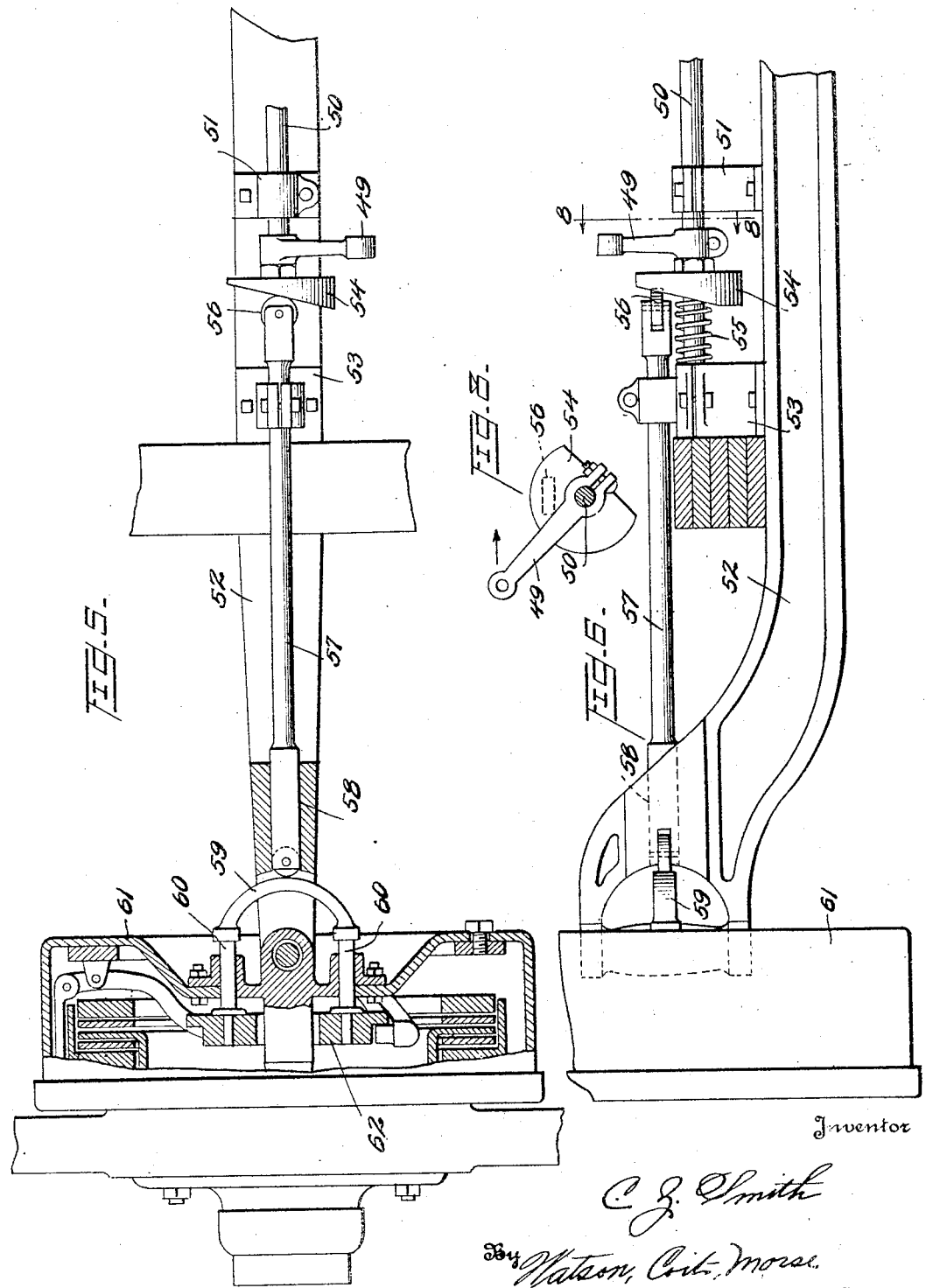

Patented June 12, 1928.

1,673,210

UNITED STATES PATENT OFFICE.

CLARENCE Z. SMITH, OF ATLANTA, GEORGIA.

AUTOMOBILE BRAKE.

Application filed September 27, 1924. Serial No. 740,303. Renewed June 28, 1926.

The present invention relates to brakes for vehicles, and particularly to brake operating systems for motor vehicles.

The general object of the invention is to provide an improved brake system for operating simultaneously brake mechanism associated with both the front and rear wheels of a motor vehicle.

In copending application, Serial No. 687,602, filed January 21, 1924, there is disclosed an operating system and a specific brake connected therewith and applied to both the front and rear wheels. The present invention provides an improved operating system, which, although particularly adapted for application to the specific brake mechanism described in said application, can be used advantageously with other types of brakes.

A particular object of the present invention is to provide a brake operating system which automatically adjusts itself for any differences in adjustments of the brake mechanism. This object is carried out by associating with the rear and front wheel brakes a floating operating shaft which equalizes the brake application on the two wheels by automatically adjusting itself in accordance with any differences in adjustments of the brake mechanism.

Another object is to effect an improved transmission from the foot lever to the front and rear wheel brakes by which the front wheel brakes will be applied with predetermined less intensity than that of the rear wheel brakes, and by means of which a soft velvety pedal will be obtained.

Other objects and advantages of the invention will become apparent hereinafter.

Referring to the drawings:

Fig. 1 is a plan view of the wheels and frame of a motor vehicle showing my improved brake mechanism applied thereto;

Fig. 2 is a side view;

Fig. 3 is a fragmentary view on a larger scale showing in horizontal section one of the rear wheels and associated brake mechanism and showing a portion of the rear axle housing and my improved brake operating devices mounted thereon;

Fig. 4 is a rear elevational view view of the axle housing and brake operating devices;

Fig. 5 is a horizontal sectional view through the front axle showing my improved brake mechanism as applied to the front wheels;

Fig. 6 is a front view in elevation of the mechanism shown in Figure 5;

Figs. 7 and 8 are detail views showing in side elevation the rear and front cams, respectively, and the operating arms associated therewith.

Referring first to Figures 1 and 2, 10 is a transverse rod secured to the sides of the frame, and 11 is a foot lever pivoted thereon. Rearwardly of rod 10 a shaft 12 has its ends journaled in the sides of the frame, and rigidly with this shaft is an upwardly and rearwardly extending arm 13 which is connected to lever 12 by a link 14. Also rigid with shaft 12 are two pairs of lever arms 15 and 16, the members of each pair consisting of an arm extending upwardly from the shaft and an arm extending downwardly. The arms of the respective pairs may, as shown, be integrally formed and extend parallel with arm 13. Pivoted in the ends of each arm of the pairs 15 and 16 is a block 18 and slidably mounted in each block is a rod. The rods 19 thus connected to the upper arms of the pairs extend rearwardly through guides 20 mounted on a tie rod 21 and are connected at their rear ends to brake mechanism associated with the rear wheels. The rods 22 connected to the downwardly extending arms of the pairs extend through guides 23 and are connected at their forward ends to brake mechanism associated with the front wheels. The rods 19 and 22 are yieldingly connected with their respective arms by means of coiled springs 24 and 25 surrounding the rods and bearing at their ends against the blocks 18 and nuts 26 on the ends of the rods.

Referring now particularly to Figs. 3 and 4, in connection with Figures 1 and 2, it will be observed that the rearwardly extending rods 19 are pivoted at their rear ends to arms 27 which are secured to the ends of a shaft 28. Shaft 28 is mounted in transversely aligned bearings formed in brackets 29 which are attached to the upper side of the rear axle housing 30. Secured centrally on shaft 28 is a cam 31 which may consist of a disk formed with sides inclined at equal angles to a central vertical longitudinal plane. Shaft 28 is freely slidable in its bearings and is yieldingly held in a central position by springs 32 which surround the shaft and bear at their ends against the bearings and cam. Push rods 33 having rollers 34 on their inner ends bearing against the inclined sides of cam 31 are slidably mounted in the brackets 29 and in brackets 35 attached to the housing. Secured on rods 33 near their outer ends are yokes 36 having arms depending at the sides of the housing and secured to the depending arms are plungers 37 which are attached at their outer ends to rings 38. The plungers are slidable in tubular bearings 39 rigid at their outer ends with the axle housing and supported at their inner ends by a yoke 40 bolted to the housing. A spring 41 between bearing 35 and yoke 36 resists outward movement of the push rods.

The brake mechanism operably connected to ring 38 is exactly the same as that disclosed in my copending application, and therefore need not be described herein in detail. This brake mechanism, as more fully set forth in the copending application, comprises a friction disk 42 secured to the rear wheel and two non-rotatable friction disks 43 slidably mounted in a casing 44 secured to the axle housing, suitable liner rings being interposed between the non-rotatable rings and the disk. The friction disk and rings are adapted to be drawn into braking relation, without subjecting the wheel bearings to thrust, by mechanism comprising a plurality of levers 45 fulcrumed on a ring 46 which is adjustably secured to casing 44. These levers are pivoted at their outer ends to hooks 47 which are adapted to engage the outer ring 43 and are formed with abutments 48 adapted to bear against inner ring 43. The inner ends of levers 45 are provided with laterally projecting pins or rollers engaging an annular shoulder on ring 38, so that when the ring is moved outwardly the levers are rotated in a direction to cause the hooks to move the outer rings 43 inwardly and to cause the abutments 48 to force the inner rings outwardly thus pressing these rings against friction disk 42 and thereby applying the brakes without subjecting the wheel bearings to any thrust whatsoever, the leverages being such that the forces acting on the outer and inner rings are exactly equal.

Referring to Figures 5 and 6 for a description of my improved brake mechanism as applied to the front wheels, rods 22 are pivoted at their front ends to upstanding arms 49 rigid with a shaft 50 rotatably and slidably mounted in brackets 51 secured to the front axle 52. The ends of shaft 50 are rotatable and slidable in bearings 53 secured to the front axle and between bearings 53 and arms 49, shaft 50 has rigid therewith cams 54. Springs 55 between the cams and bearing 53 tend to hold the shaft 50 yieldingly in a central position. Cams 54 are formed with inclined outer sides which coact with rollers 56 on the inner ends of plungers 57. These plungers are slidably mounted at their outer ends in bores 58 formed in the front axle and are slidably supported adjacent their inner ends in bearings secured to the caps of bearings 53. The outer ends of the plungers have rollers which bear against an arc-shaped member 59. This member is rigid with pins 60 which pass through apertures in a casing 61 and are secured at their outer ends to a ring 62 which is adapted to operate brake mechanism in all respects the same as that described in connection with the rear wheels. The outer arc surface of member 59 is substantially concentric with the pivots of the front wheels when the member is moved outwardly to brake application position, so that the brakes will be applied with substantially equal force in whatever angular position the front wheels may be.

It will be observed that since the cam shafts 28 and 50 are free to assume different longitudinal positions, any differences in the adjustments of the brake mechanisms operated thereby will be automatically taken care of and the brake application equalized irrespective of any such differences.

The force transmitted to the rear brakes should be greater than that transmitted to the front brakes, for obvious reasons. To provide for this, I prefer to make the lever arms of the pairs 15 and 16 equal and to make the springs 24 on the rear brake operating rods 19 stronger than the corresponding springs 25 on the front brake operating rods 22. Provisions are thus made for transmitting a predetermined greater force to the rear brakes while at the same time obtaining a soft velvety pedal.

While the embodiment of the invention shown in the drawings has been fully and specifically described, it was not intended thereby to limit the invention to the details of construction described, as it will be obvious to those skilled in the art that many changes and modifications may be made without affecting the essential character of the invention.

Having thus described the invention what is claimed as new and desired to be secured by Letters Patent is:

1. In a brake mechanism for motor vehicles having a rear axle housing, a rock shaft mounted on the housing substantially parallel to the axis thereof, a cam fixed on said shaft formed with engaging surfaces equally inclined to a central vertical longitudinal plane, a pair of push rods slidably mounted on the housing having their inner ends engaging said cam surfaces, brake mechanism associated with each rod and connected thereto so as to be applied when the rod is moved outwardly, a lever, and connections between the lever and said rock shaft.

2. In a brake mechanism for motor vehicles having a rear axle housing, a rock shaft mounted on the housing substantially parallel to the axis thereof and freely movable axially, a cam fixed on said shaft formed with engaging surfaces equally inclined to a central vertical longitudinal plane, a pair of push rods slidably mounted on the housing having their inner ends engaging said cam surfaces, springs resisting outward movement of said rods, brake mechanism associated with each rod and connected thereto so as to be applied when the rod is moved outwardly, a lever, and connections between the lever and said rock shaft.

3. In a brake mechanism for motor vehicles having a rear axle housing, a rock shaft mounted on the housing substantially parallel to the axis thereof, a cam fixed on said shaft, a pair of push rods slidably mounted on the housing having their inner ends engaging said cam so as to be moved outwardly when the shaft is rotated, springs resisting outward movement of said rods, brake mechanism associated with each rod and connected thereto so as to be applied when the rod is moved outwardly, a lever, and connections between the lever and said rock shaft.

4. In a brake mechanism for motor vehicles having a rear axle housing, a rock shaft mounted on the housing substantially parallel to the axis thereof, a cam fixed on said shaft formed with engaging surfaces equally inclined to a central vertical longitudinal plane, a pair of push rods slidably mounted on the housing having rollers on their inner ends engaging said cam surfaces, springs resisting outward movement of said rods, yokes secured to said push rods having arms depending at the sides of the housing, plungers mounted on said housing and secured at their inner ends to the said depending arms, brake mechanism operably connected to the plungers, a lever, and connections between the lever and said rock shaft.

5. In a brake mechanism for motor vehicles having a rear axle housing, a pair of transversely aligned brackets secured to the upper side of the housing, a shaft rotatably and slidably mounted in said brackets, a cam fixed on said shaft having engaging surfaces equally inclined to a central vertical longitudinal plane, springs between the cam and brackets adapted to hold the cam yieldingly in a central position, arms secured to the ends of said shaft, a lever, connections between said lever and arms, push rods slidably mounted on the housing having rollers on their inner ends engaging said cam surfaces, springs resisting outward movement of said rods, yokes secured to said rods having arms depending at the side of the housing, plungers slidably mounted on the housing connected to said depending arms, and brake mechanism operably connected to said plungers.

6. In a brake mechanism for motor vehicles having a rear axle housing, axles mounted therein and wheels secured to the axles, a pair of transversely aligned brackets secured to the upper side of the housing, a shaft rotatably and slidably mounted in said brackets, a cam fixed on said shaft having engaging surfaces equally inclined to a central vertical longitudinal plane, springs between the cam and brackets adapted to hold the cam yieldingly in a central position, arms secured to the ends of said shaft, a lever, connections between said lever and arms, push rods slidably mounted on the housing and having their inner ends engaging said cam surfaces, springs resisting outward movement of said rods, yokes secured to said rods having arms depending at the sides of the housing, plungers secured to said arms slidably mounted on the housing, rollers secured to the outer ends of said plungers, friction disks carried by the wheels, friction disks slidably mounted on the housing, and mechanism operable by said collars to force said disks into engagement.

7. In a brake mechanism for motor vehicles, a transverse rock shaft journaled on the chassis, arms secured to said rock shaft, rearwardly and forwardly extending rods slidably mounted in the ends of said arms, springs surrounding said rods and located between the ends of said arms and abutments on said rods so as to be compressed when the shaft is rocked in a direction to apply the brakes, a lever, a connection between the lever and rock shaft, a transverse shaft journaled on the rear axle housing having arms connected to said rearwardly extending rods, a cam on said transverse shaft, push rods operated by said cam, brake mechanism operated by said push rods, a transverse shaft journaled on the front axle, cams on said shaft, push rods operated by said cams and brake mechanism operated thereby.

8. In a brake mechanism for motor vehicles, a transverse rock shaft journaled on the chassis, arms secured to said rock shaft, rearwardly extending rods and forwardly extending rods slidably mounted in said arms, springs surrounding said rods and located between said arms and abutments on said rods so as to be compressed when the shaft is rocked in a direction to apply the brakes, a lever, a connection between the lever and rock shaft, a transverse shaft rotatably and slidably mounted on the rear axle housing having arms connected to said rearwardly extending rods, springs yieldingly holding the last mentioned shaft in a central position, a cam on the last mentioned shaft, push rods operated by said cam, a transverse shaft rotatably and slidably mounted on the front axle having arms connected to said forwardly extending rods, springs yieldingly holding the last mentioned shaft in a central position, cams on the last mentioned shaft, push rods operable by said cams and brake mechanism operable by said push rods.

In testimony whereof I hereunto affix my signature.

CLARENCE Z. SMITH.